Jan. 18, 1944. F. S. SMITH 2,339,654
METHOD AND APPARATUS FOR DESTROYING INSECT LIFE
Filed Sept. 26, 1939 3 Sheets-Sheet 1

INVENTOR
Franklin S. Smith
BY
ATTORNEY

Jan. 18, 1944.     F. S. SMITH     2,339,654
METHOD AND APPARATUS FOR DESTROYING INSECT LIFE
Filed Sept. 26, 1939     3 Sheets-Sheet 3

INVENTOR
Franklin S. Smith
BY
ATTORNEY

Patented Jan. 18, 1944

2,339,654

UNITED STATES PATENT OFFICE 2,339,654

METHOD AND APPARATUS FOR DESTROYING INSECT LIFE

Franklin S. Smith, New Haven, Conn.

Application September 26, 1939, Serial No. 296,543

23 Claims. (Cl. 21—2)

This invention relates to treating materials and more in particular to a method and apparatus for effecting the destruction of all insect life in a flowable product composed of individual solid parts such as flour or the like.

One of the objects of this invention is to provide a dependable and efficient method and apparatus for destroying the life of insect infestation, including all eggs, larvae, pupae, and adults, found in milled products such as flour. Another object is to provide a method of destroying all insect life in such products capable of being carried on effectively in conjunction with otherwise usual or normal production or handling in mills of such products and to provide an apparatus for effecting the destruction of all insect life in flour, and the like, in bulk, in such a way that the apparatus may be readily interposed or connected at any suitable point into the usual production channels or routine employed in the milling and handling of flour.

Another object is to provide an apparatus for destroying all insect life in a flowable product composed of individual solid parts such as flour, or the like, that will be thoroughly practical, of simple construction and reliable action, and capable of functioning, at efficient capacity, in the course of effecting a continuous stream or flow of flour. Another object is to provide a strong and durable treating apparatus that will be well adapted to meet the varying conditions of hard practical use met with in flour mills, or the like. Another object is to provide an apparatus of the just mentioned nature which will be of simple construction, capable of ease and rapidity and simplicity of assembly or of disassembly, and which will be safe and simple to install and operate.

Another object is to provide a simple and efficient method of effecting destruction or destruction and separation of insect infestation in flour, and the like, and which may be readily carried on in practice. Another object is to provide a simple and thoroughly practical apparatus for carrying out the just mentioned method. Another object is to provide an apparatus of the above-mentioned nature in which parts rotating at relatively high peripheral velocities may be safely employed and with minimum wear or destructive effects upon the apparatus. Another object is to provide, in an apparatus of the above-mentioned character, simple, compact, and efficient driving means, and a mounting and assembly therefor, for the effective parts that rotate at high peripheral velocities; another object is also to provide for ready and convenient access to the latter and to provide for convenient and speedy assembly or disassembly thereof from the remaining parts of the apparatus, for purposes of cleaning, replacement, or the like. Another object is to provide, in apparatus of the above-mentioned character, for the mounting of high velocity rotating parts to minimize or avoid vibration or other detrimental effects that might arise from unbalanced conditions that might be created by the products undergoing treatment. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings in which are shown several of the various possible embodiments of the mechanical features of my invention.

Similar reference characters refer to similar parts throughout the several views of the drawings.

Figures 1, 2:
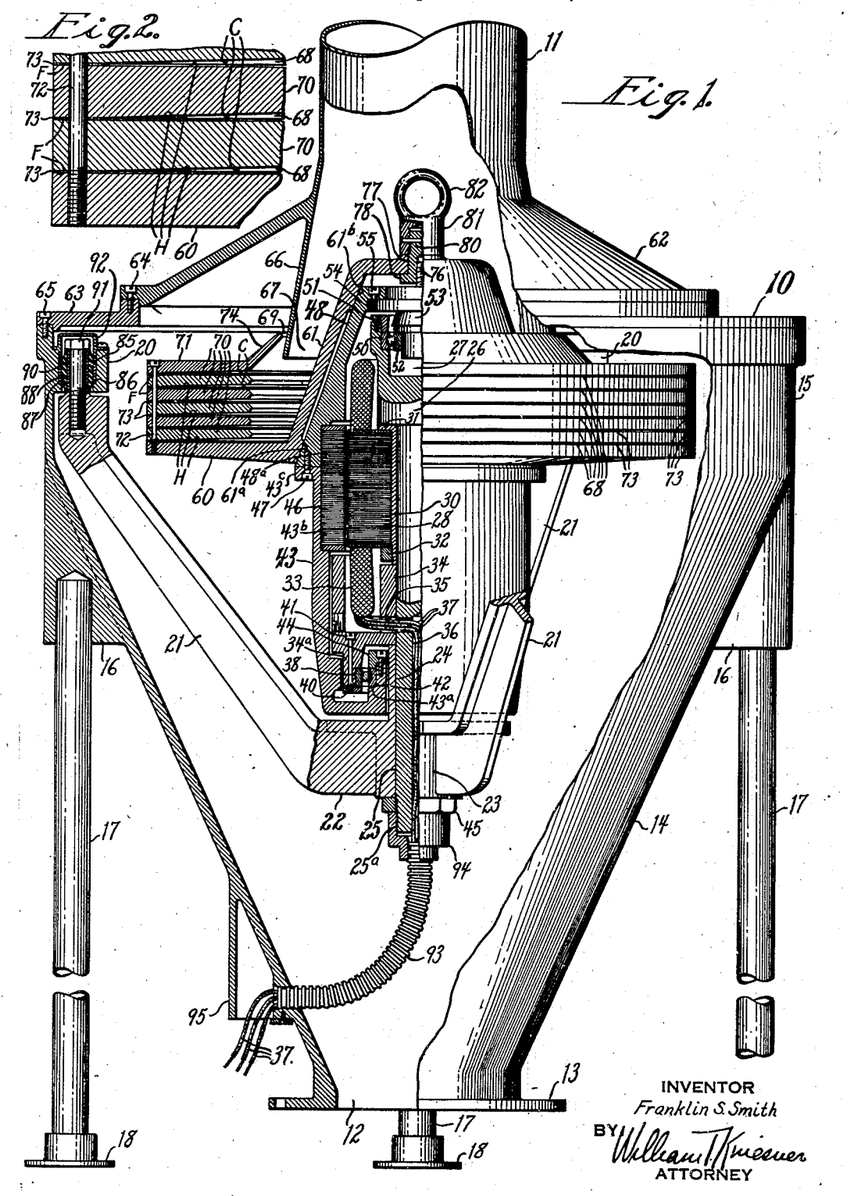
Figure 1 is a front elevation of the apparatus with the left half in central vertical section, certain parts being broken away to show certain other parts and arrangements more clearly.
Figure 2 is a fragmentary view on an enlarged scale, of a portion of certain of the parts shown in Figure 1.
Figures 3, 7:
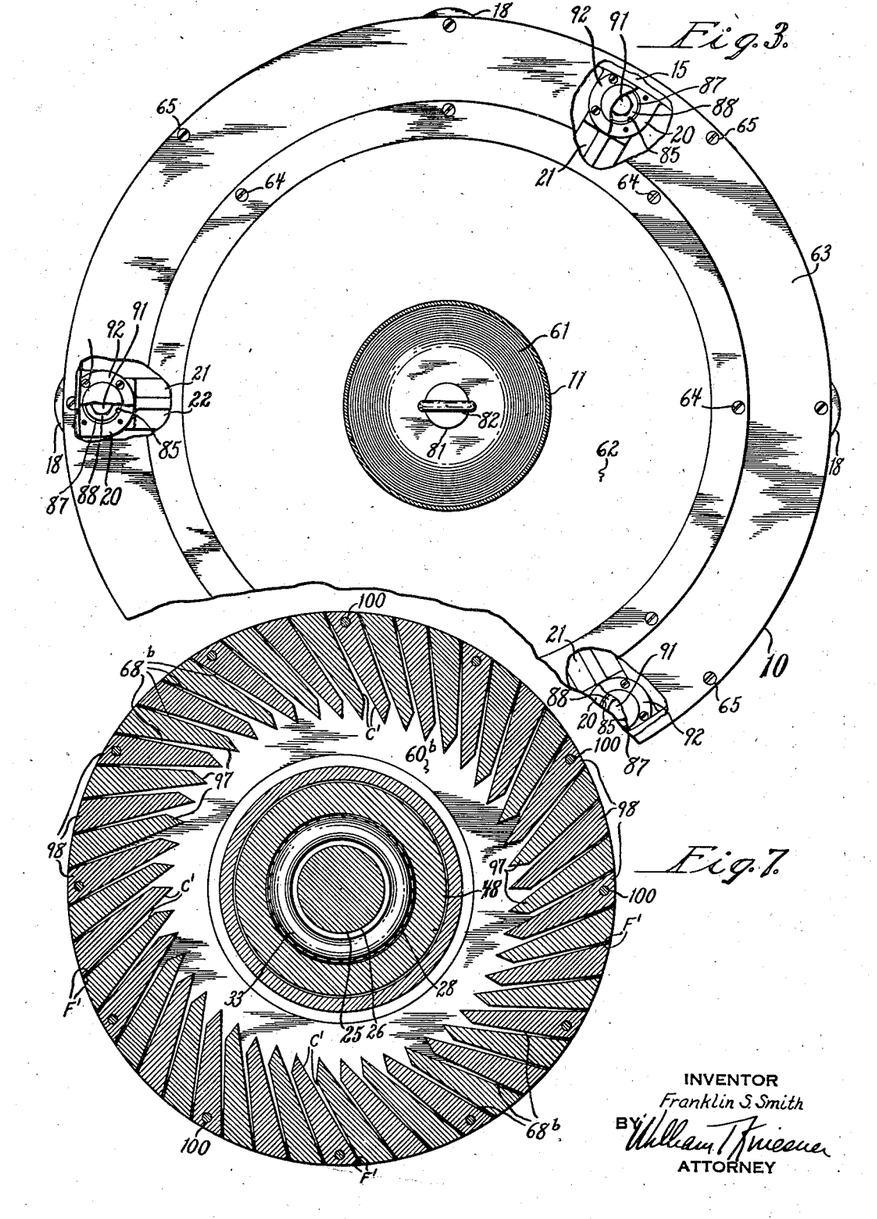
Figure 3 is a plan view, as seen from the top in Figure 1, certain parts being broken away.
Figure 7 is a horizontal sectional view as seen along the line 7—7 of Figure 6.

Referring first to Figures 1 and 3, I preferably provide a casing-like structure generally indicated by the reference character 10 suitably provided with an inlet passageway or conduit 11 at its upper end and an exit passageway 12 at its lower end, these passageways being provided with any suitable means, such as is illustrated by the flange 13 with respect to passageway 12, by which they may be connected into an existing arrangement of flour-handling or preparing machines or mechanisms of a mill.

Preferably, the casing structure 10 is built in several sections; thus, I prefer to provide a lower section 14 generally frusto-conical in shape, terminating at its lower end in the above-mentioned exit passageway 12 and connecting flange 13 and merging into a cylindrical portion 15 at its upper end; casing section 14 may be in the form of a suitable casting and its above-described illustrative shape will be seen to give it substantial strength and rigidity. It is provided preferably with any suitable supports or standards by which it may be supported from a floor, or the like, and thus it may have equiangularly distributed about it and integrally formed therewith a suitable number, such as four, of socket-like portions 16 into which are received and secured the upper ends of a similar number of standards 17 which may be provided at their lower ends with any suitable means 18, resting upon the supporting floor or surface and secured thereto.

Internally of the upper cylindrical portion 15 of the casing section 14, and preferably integrally formed therewith, are supporting lugs 20 preferably, for reasons later explained, three in number, as is better shown in Figure 3, being therefore and preferably equiangularly spaced and hence, as seen in Figure 3, spaced from each other by 120°.

From the lugs 20, in a preferred manner later described, are supported the three arms 21 of an internal spider-like frame generally indicated by the reference character 22, arms 21 being inclined downwardly and inwardly from their upper ends which underlie the supporting lugs 20 and merging into a central hub-like portion 23 which is bored out, as at 24, to receive a relatively stiff and strong shaft member 25 whose axis is thus held substantially vertically and preferably also substantially in line with the vertical axis of the casing structure 10.

It is about the axis of the vertical shaft member 25 that I prefer to rotate the rotating parts of the sterilizing apparatus and where, as in the preferred case, it is desired to drive the rotating parts electrically, I prefer to incorporate upon and about the shaft 25 also the various parts of the electric driving means which, preferably and illustratively, takes the form of an electric motor of the polyphase alternating current type, such as, for example, an induction motor. In such case, also, I prefer, for convenience and greater simplicity of construction and assembly, to interrelate certain features of the mounting of the rotating parts of the sterilizing apparatus and the rotating part or parts of the motor, preferably in the manner about to be described.

Shaft 25 has an upper portion 26 of enlarged diameter, thus providing a shoulder, as shown in Figure 1, and being bored out, as at 27, for a purpose later described. Onto the shaft 25 is slipped or strung the field or stator structure of the motor comprising preferably suitably slotted laminations 28 of annular shape which are strung onto a sleeve 30 against the end flange 31 of which the laminations 28 are clamped by the clamping nut 32 threaded onto the opposite end of the sleeve 30. To the laminations 28 are related the field or stator windings 33, being wound or formed in any suitable way, the laminations 28 being conventionally slotted for the reception of the windings 33. This sub-assembly, thus comprising the field or stator structure, is fitted onto the shaft 25 with the flanged end 31 of the sleeve 30 against the shoulder 26.

Next there is slipped onto the shaft 25 a relatively heavy sleeve 34 which has an aperture 35 therein that is brought into position to meet with the exit end of a channel or passageway 36 cut through the shaft 25 from its lower end, so that the conductors 37 from the windings 33 may be threaded therethrough, as shown in Figure 1, and brought out through the lower end of the shaft 25.

The sleeve 34 has an extension 34ª that is of greater diameter than the sleeve 34, being rabbetted, as shown, on its inner face to receive the outer race 38 of an antifriction bearing such as a roller bearing; a ring 40, secured by screws 41 to the lower annular end of the part 34ª holds the race 38 in the rabbet.

The inner race 42 of the antifriction bearing is seated in a rabbet formed in the internal lesser-diametered sleeve portion 43ª of a cylindrical part generally indicated by the character 43, being held in the rabbet by a ring 44 secured to the sleeve portion 43ª as by screws, as shown. The sleeve portion 43ª and the ring 44 have an internal diameter greater than the upwardly projecting portion of the hub 23 of the auxiliary frame 22, so as to adequately clear this portion of the hub.

With the parts thus far described assembled to the shaft 25, the resultant sub-assembly may now be related to the auxiliary frame 22 and this is done by letting the lower end of the shaft 25 into the bore 24 of the hub 23 to a sufficient extent to bring the parts to rest with the lower end of sleeve member 34, abutting against the upward extension of the hub 23. The lower end of the shaft 25 is threaded, as at 25ª (Figure 1), and a nut 45 is now threaded onto the shaft and tightened up, causing the shaft 25 to be drawn downwardly (as viewed in Figure 1) and causing the hub 23, the sleeve 34, and the sleeve 30 to be tightly clamped between the nut 45 and the shoulder 26 of the shaft. Thereby the assembly of these parts becomes secure and rigid and, moreover, the shaft 25 becomes securely fastened and mounted to the auxiliary spider frame 22.

The cylindrical part 43 is internally bored out, as at 43ᵇ, to form a seat for the previously assembled rotor structure 46 which, in the illustration, takes the form of annular stacked laminations, embodying a conventional squirrel cage winding, and suitably conformed for coaction with the above-described field or stator structure, these two parts becoming juxtaposed to each other, as shown.

The upper end of the cylindrical part 43 is flanged, as at 43ᶜ, to receive securing screws 47 that are threaded into the lower end of a part generally indicated at 48 which is preferably externally frusto-conical, for a purpose later described, and which is counterbored internally, as at 48ª, to form a seat or annular recess, companion to the counterbore 43ᵇ of the part 43, to accommodate so much of the rotor structure 46 as is not accommodated in the part 43. Thereby, also, the rotor structure 46 becomes clamped and dependably secured in position, the parts 43 and 48 together functioning also as a casing for the motor.

The upper end of the frusto-conical member 48 is made to take part in the rotatable support of the various rotating parts and for this purpose I prefer to provide a rabbet in the counterbore 27 at the upper end of the large shaft portion 26 to provide a seat for the outer race 50 of a combined thrust and radial antifriction bearing, such as a roller bearing, which is assembled thereon in its entirety, race 50 being held in its rabbet as by a suitably flanged ring 51 secured, as by screws, to the upper end of the shaft portion 26.

The top, or flat portion, of member 48 is provided with a counterbore 54, into which the larger diametered portions of a generally cylindrical part 53 tightly fit, being held in position as by screws 55. The lower portion of part 53 is provided with an external rabbet, which enters the inner race 52 of the bearing when the member or motor-casing part 48 with assembled member 53 is assembled to the lower member or motor-casing part 43 and then secured by screws 47 as above described and as shown in Figure 1.

With the field or stator structure 28—33 thus dependably mounted and anchored by the vertical stud shaft 25 and related parts, the rotor 46 and the interconnected motor-casing parts 43 and 48 become mounted as a unit for rotation about the axis of the stationary stud shaft 25, by way of the antifriction bearings 38—42 and 51—52. The motor parts will be seen to be substantially enclosed and, with the bearings, adequately sealed against entry thereto of flour particles or other foreign matter, and the external frusto-conical surface of the member 48, with its smaller end upward, is now ready to receive, for mounting thereon, the rotary parts of the apparatus.

These parts provide an open-ended space or passageway configured, as is later illustratively set forth, to effect destruction, or destruction and separation, of insect infestation in the flour when both flour and its infestation are moved, preferably in the manner later illustratively set forth, relative to the configured passageway; in the illustrative embodiment, these parts comprise preferably a main support preferably taking the form of a relatively heavy annular carried plate 60 which is preferably integrally formed with a frusto-conical cap-like hub 61 provided with an internal surface or surfaces, as at 61$^a$ and 61$^b$, that closely interfit the external frusto-conical face of the member 48 to which it is secured preferably in the manner later described and whereby the carrier plate 60 with its hub 61 becomes accurately mounted with its axis coincident with the axis about which the rotary supporting parts 48—43 are to rotate when driven.

The hub-like cap 61 preferably coacts with other devices, as later described, for securing it to the member 48, and as is better shown in Figure 1 it will be seen that the cap-like hub 61 also closes over the upper ends of the above-described parts that are related to and rotatably carried by the vertical stud shaft 25. The inlet conduit or passageway 11, by which the flour is fed to the apparatus, is preferably coaxial with the cap-like hub 61 and preferably is formed as an upward extension of a frusto-conical casing section 62 which at its lower end is rabbetted to interfit with an annular plate 63 to which it is removably secured as by screws 64 and which in turn is rabbetted to interfit with the upper peripheral edge of the cylindrical portion 15 of the casing section 14 to which it is in turn removably secured as by the screws 65. Preferably, the upper casing section 62 is provided with an interior downward frusto-conical extension 66 of the conduit 11, the part 66 extending downwardly about and spaced from the upper portion of the cap-like hub 61, forming therebetween an annular unobstructed passageway 67, thus to distribute the incoming flour more or less uniformly, in a moving mass or stream that is annular in cross-section, toward the region adjacent the junction of the annular carrier plate 60 and the cap-like hub 61.

In the form of apparatus of Figure 1, the carrier plate 60 supports or has related to it means that provide a configured space taking the form of a suitable number, illustratively six, annular slots 68 which are open at their outer peripheries for the discharge of flour and which are open at their inner peripheries adjacent the hub member 61 for the reception of infested flour from the above-described annular stream or flow of in-fed flour, each space or slot, however, being, as to its configuration, illustratively and preferably convergent in the direction of increase of its radius, which is the general direction in which the infested flour is to be moved. An illustrative and preferred manner of providing this construction comprises the provision of a suitable number of plates 70, preferably annular in view of my preferred manner of effecting movement of the flour as latter described; plates 70 are illustratively five in number, being preferably interposed between the carrier plate 60 and an upper plate 71 and all held together and in accurate concentric relation by any suitable means, such as screws 72. Each pair of the opposed adjacent faces of these plates are suitably shaped to provide therebetween a treatment space of the above-mentioned character.

The upper annular faces H of plates 70 and plate 60 are at right angles to their axis of rotation; the lower surfaces of plates 70 and plate 71 include annular faces F adjacent their peripheries and parallel to faces H and also frusto-conical annular faces C extending inwardly from faces F. Interposed between each face F and the opposed face H of the plane members is a series of washer-like spacers 73 shown in Figure 2 which are strung on to the securing screws 72. Screws 72 and spacers 73 are equiangularly spaced about the plates, for example, 30 degrees apart. These spacer washers 73 are all of the same thickness so that the plates 60, 70 and 71 provide a rigid and dynamically balanced rotatable structure wherein the thickness of the space between adjacent faces F and H is uniform, and the radial cross-section of slots 68 is the same throughout.

The thickness of this space may be varied according to circumstances and any change that may be desired may be effected by replacing the washers 73 by washers of the desired thickness. The thickness of this space, being the dimension of the restricted or exit ends of the slots 68, is preferably made as small as is practicable, with due consideration of the type of flour and the kind of insect life or insect infestation met with in the flour. In view of the usual or more common type of insect infestation, the thickness of this space preferably is 0.006 inch, that dimension being sufficient to prevent the passage therethrough of the various stages or forms, either eggs, larvae, pupae, or adults, of the insect life or infestation. Thus, for example, the flat grain beetle is the smallest beetle common in flour, and in its smallest form of life, a newly hatched larva, I have found, is dimensioned so that it will not pass through this thickness of space without destruction of its life.

As above noted, the faces C extend inwardly from the inner margins of the respective annular faces F of the plates; the faces C are shaped relative to their juxtaposed faces H so that the spaces therebetween are convergent in the direction of increase of radius, the minimum dimension or restriction coinciding with or terminating at the inner end or edge of the annular space between faces F and H. This convergence may be achieved as by giving faces C a frusto-conical form or shape, as it better shown in Figure 2.

The angle subtended by faces C and H is preferably quite small, being illustratively about one degree; hence, where faces H are in planes at right angles to their common axis of rotation, the faces C are inclined downwardly and outwardly, substantially frusto-conically, at an angle of inclination to the faces H of about one degree.

It is into these converging spaces or slots 68 that the flour with its insect infestation is to be moved or flowed in the direction of the convergence or toward the restrictions of the spaces and at velocities sufficient to achieve the effects later described. These spaces or slots (Figures 1 and 2) will be seen to be open ended, with those ends thereof that are of greater thickness or axial dimension being nearer the axis of rotation and being the inlet ends, while the restricted or narrower end portions of these spaces are farther from the axis of rotation and are to function as discharge or outlet ends.

The inner or inlet ends are preferably provided with extensions that are mouthed or funnel-shaped in cross-section for the better entry of the flour and its infestation into the spaces; this arrangement may be achieved as by suitably forming the inner annular edges of plates 70. Thus, as shown in Figure 1, they may be given a substantially V-shaped form in cross-section, to provide exposed faces of suitable angle, thus also to prevent retention of flour against an otherwise inwardly exposed cylindrical surface.

Preferably, the uppermost plate 71 is provided with an upwardly and inwardly inclined flange 74 whose lower surface extends upwardly, at suitable angle, above and about the lower end of the guide part 66, thus to better define and confine the annular space between the inner annular edges of the plate 70 and the lower portion of the cap-like hub member 61 into which the above-mentioned annular stream or flow of flour is received.

It is along these converging spaces or slots 68 and in the direction of convergence that I cause the flour and insect infestation to move with sufficient velocity to flow the flour therethrough and out of the discharge or outlet ends and to cause the infestation, in whatever form or stage that it is present, to become deformed, compressed or squeezed, and its life destroyed, in the narrower or narrowest portions of the converging spaces. Stated in another way this action may be termed an infliction of lethal trauma on all insect life in the flowing flour. These actions I preferably achieve by setting the above-described built-up annular rotary flour-treating unit in rotation at a suitable speed appropriately related to the radii of the parts in which the converging spaces or slots are formed and to the characteristics of the product undergoing treatment. This causes the flour to exert sufficient centrifugal force to move it into and through the outwardly converging slots and to cause the insect life, in whatever stages it is present in the flow, likewise to exert sufficient centrifugal forces to move its individual entities into and along the outwardly converging portions of the slots formed by the contiguous faces C and H. Thus the juxtaposed converging faces and, if necessary, the narrowest portions of the spaces or slots as defined by the juxtaposed parallel faces F and H, deform or compress the insect life to effect its destruction. Illustratively, and with the above described illustrative slot thicknesses, I have obtained good results where the insect life and flour exert centrifugal forces at the outlet of the slots on the order of 4000 times gravity, or over.

Thus, for example, where the outside diameter of the built-up structure 60—70—71 of Figure 1 is 23 inches, the radial dimension of the slot portion defined by the faces F and H is on the order of ½ inch and the spacing between them about 0.006 inch, and the converging slot portion defined by the faces C and H is of a radial dimension on the order of five inches, and the maximum slot thickness or opening is of about 0.1 inch at the inner annular ends thereof, a speed on the order of 3450 R. P. M. (the characteristics of the preferred form of two-pole 60-cycle induction motor drive above-described are well suited to such a speed), is appropriate to bring about destruction of insect life with a flow of flour at the rate of about 75 pounds per minute per annular slot. Under the just-stated circumstances, the centrifugal forces exerted are on the order of 2200 times gravity at the inlet ends of the spaces or slots and 4000 times gravity at the peripheral exit ends thereof. As for the rate of flow of flour, that may, of course, vary somewhat according to the kind and grade of flour being treated.

The above-stated dimensions and speed of rotation are, of course, illustrative, and the various factors may be varied one with respect to another. Thus, if it is desired to cause greater centrifugal forces to be exerted, the peripheral velocity of rotation may be increased or the effective diameter of the slotted annulus increased, while retaining the same speed; or the speed of rotation may be increased and the outside diameter of slot may be decreased to generate the centrifugal forces desired. As a general guide, the known formula, namely, centrifugal force times gravity equals peripheral velocity squared divided by the product of the radius and the acceleration of gravity, may be used. The rate of convergence of the slot or slots may also vary according to the actions desired or character of results sought, though I prefer to employ a rate of convergence on the order of that above indicated which I have found to give a good rate of free unobstructed flow of flour particles with minimum tendency of the flour to arch over at points along the adjacent relatively inclined faces C, H. The inlet end of a slot or space 68 is preferably large enough to admit, under the influence of the forces exerted, the largest stage of insect life encountered in the flour to be treated. The greater the forces exerted at the region or point of entry, the smaller the slot entrance may be.

The more acute the slot angle or angle at which the walls of the space or slot converge, and the smaller the annular spacing at the slot restriction or at the slot periphery, the greater the effectiveness in destroying infestation. The more acute the slot angle, the greater the radial dimension of slot to attain sufficient inlet dimension to admit the large stages of infestation. The greater the spacing at the region of minimum slot restriction, the greater the flour-treating capacity and good infestation destroying results may be attained with this dimension about 0.008 inch. The angle between the walls of the converging space or spaces, as between the faces C and H, is such that, for a given rate of feed of flour to the treatment apparatus, choking up of the spaces by the flour is avoided.

In the preferred manner of operating the apparatus, I prefer to feed the flour to the apparatus, as by the inlet conduit 11, at a rate, preferably substantially uniform or steady, commensurate with the rate at which the rotary unit discharges flour from its periphery, and for this purpose I may employ any suitable or known means (not shown) for regulating the flow of flour into or through the inlet passageway 11. The above-mentioned annular space or zone between inlet ends of the spaces or slots at the inner edges of the plates 70 and the lower portion of the hub member 61 is preferably made sufficiently large so that it does not become completely filled up or packed with flour as the latter is fed to it through the annular passage 67. The flour reaching this annular zone or space is, of course, at once set into movement about the axis of the rotary unit and the flour, with such insect infestation as it contains, at once exerts centrifugal forces and is by the latter moved in a generally outward direction and hence toward and into the inlets of the converging slots 68. The subsequent paths taken by flour particles and insect entities are curvilinear paths, of increasing radii, progressing in this way from the entry ends of the slots toward the exit or peripheral ends of the slots, and they may also be in the form of twisted curves. These actions may be aided by similar movements of air which enters the apparatus through the inlet conduit 11 along with the flour for, as above indicated, the rate of feed is preferably such that the flour does not descend in the conduit 11 in a solid stream; also, air otherwise entrained with the flour may be similarly acted upon, being by the centrifugal forces it exerts moved in a general outward direction, though in curvilinear paths of increasing radii, from the inlet ends of the slots to the outlet ends.

In this latter connection, the inclined flange 74 (Figure 1), rotating with the unit, aids in deflecting the flour downwardly and may and preferably does take part in causing an air current to enter the annular opening 69 between flange 74 and the extension 66 of the inlet 11, this incoming current of air coacting with the flange 74 to prevent untreated flour from escaping upwardly through the passage 69. Thus all of the flour and insect life is confined to the treating area, i. e. it must all pass into the treating spaces 68. This air current is virtually a circulatory one, for coming in through the annular passage 69, it is by the above-described centrifugal action in the spaces between the plates discharged peripherally in the casing structure 10 whence it may pass upwardly into the latter again to enter the annular passageway 69.

Where the outlet ends of slots 68 are exposed or terminate in the cylindrical periphery of the construction of Figure 1, the flour discharges therefrom in a general tangential direction into the upper portion 15 of the casing structure 10 to the lower frusto-conical casing section 14 by which it is guided, as it swirls and falls downwardly by gravity, into the discharge passage 12. As for the various stages of insect life, however, they preferably do not emerge from the narrowest portions of the slots or spaces. Such insect life, in whatever stage it happens to be, is by the centrifugal force that it exerts moved, as above indicated, in curvilinear paths of increasing radii, along the converging slots or spaces and in a direction toward the narrower or more restricted portions thereof, and it becomes crushed, squeezed, or otherwise deformed, and thus its life destroyed, by the force with which its individual entities are moved more and more into the progressively diminishing or progressively more restricted space formed by the converging faces C and H of the rotary unit. As above indicated, the apparatus is preferably so constructed or operated that the force thus exerted upon any stage of insect life is sufficient to effect destruction by such crushing or squeezing action and centrifugal forces on the order of 2000 to 4000 times gravity are found to give adequate destructive effects.

The destroyed insect life, in the preferred construction and operation, preferably does not emerge from the restricted ends of the converging passages but in effect becomes wedged and thus entrapped, in destroyed form. Some times this occurs at some points spaced inwardly toward the axis of rotation from the region of minimum spacing between converging faces C and H, as when the form of insect life is of substantial size as compared with the above indicated minimum dimension of 0.006 inch. Where the form of insect life is smaller, the destructive squeezing action takes place nearer to or at the just-stated region of minimum spacing and preferably to obtain greater certainty of destructive action, this region of minimum spacing is extended outwardly in a radial direction by the provision of the parallel annular faces F and H, as above described. Thus, the smallest forms of insect life might even be forced through the region of minimum spacing between the converging faces C and H, undergoing their complete or partial destruction, whence they may enter the thus extended region of minimum spacing, namely, between the faces F and H, where they become entrapped and destroyed.

It may also be that not all of the destroyed infestation is indefinitely retained within the slots 68. The percentage retained may depend upon various factors, such as the kind and stage of insect life destroyed and entrapped, and upon the quantity of flour passed before the slots are cleaned. It is flour mill practice to mill continuously for six days and consequently if this treating equipment is in the flour stream for that duration the dead and entrapped infestation becomes dry and considerably worn away by attrition of the flowing flour, and hence dust-like particles of dead infestation pass with the flour.

In operation, heat losses in the motor are dissipated efficiently through the external moving surfaces of the rotating parts, particularly such as the motor casing part 43, and thus temperature conditions detrimetal to the flour cannot arise. Moreover, the rotary movement of the exposed surfaces prevents flour from becoming deposited or retained thereon.

Any suitable means may be employed for removing the thus destroyed and entrapped infestation. Illustratively, I may provide for the ready removal of the rotary flour-treating unit from the apparatus so that it may be cleaned. Thus, for example, I may remove the upper casing part 62 by removing the screws 64, it being noted that the round aperture in the annular plate 63 is of a diameter greater than the outside diameter of the unit 60—70—71 so that the latter may be lifted upwardly therethrough.

Accordingly, and preferably, I provide for the ready detachment of the rotary unit from its rotary mounting and in that connection I preferably provide the generally cylindrical part 53 (Figure 1) with a heavy threaded stud 76 which protrudes coaxially through the upper casing part 48 of the motor. With the threaded stud 76 coacts a nut 77 having a cylindrical exterior that interfits with a round clearance hole in the center of the upper face of the cap-like hub member 61, the nut 77 having at its lower end a flange 78 that engages the under face of the cap member 61 and having a shank 80 at its upper end to which is secured, as by threading and then anchoring by a pin, as indicated in Figure 1, the cupped shank portion 81 of an eye member 82. Thus, the nut 77 may be rotated relative to the hub member 61 but is held against relative movement thereto in the direction of their coincident axes.

When the rotary flour-treating unit is assembled to its rotary support, it is let down to bring the hub 61 over the mounting member 48 whence the nut 77 is engaged with the threaded stud 76 by effecting relative rotary movement between the two, and as the threaded stud 76 enters the nut 77, the cap-like hub 61 is drawn or forced downwardly and the mating frusto-conical face or faces 61ª and 61ᵇ of the hub 61 are forced into tight and secure interfitting with the corresponding tapered or frusto-conical outer face of the member 48. Where the rotary unit rotates in clockwise direction, as viewed in Figure 3, the threads of the stud 76 and nut 77 are preferably left-hand.

When, as above suggested, it is desired to remove the rotary unit, as for purposes of cleaning it, the eye member 82 is turned in a direction to unscrew the nut 77 from the stud 76, this action effecting an upward movement of the hub member 61 with its related parts relative to the mounting member 48, and thus the tight interfit of the tapered or frusto-conical parts may be easily and conveniently broken. Upon completion of unthreading of the nut 77 from the stud 76, the rotary unit may be lifted out through the annular opening in the casing section 63, and the entrapped and destroyed forms of insect life removed from the passages in any suitable way. Thus, also, the built-up rotary unit may be disassembled; by removing the several screws 72 and washers 73, the plate members 60, 70 and 71 may be separated from each other. If desired, the cleansing operation may also in this manner be carried out, the separation of the plates or their disassembly giving direct access to the various faces F, H and C at which the destruction and entrapping take place.

I prefer to make suitable provision to guard against overstressing the parts rotating at high peripheral velocities, and to prevent damage by the creation of an unbalanced condition caused, for example, by non-uniform distribution of flour and particularly of entrapped forms of insect life and consequently blocked flour in the various converging passages. Preferably, the rotary flour-treating unit is constructed of a wrought aluminum alloy, on account of its relatively high ratio between strength and density. On account of the high peripheral velocity at which my apparatus may be operated, the rotating parts are preferably balanced dynamically. Nevertheless, unbalanced conditions might arise due to such factors as have been mentioned.

Accordingly, I prefer to provide an arrangement that permits the rotating mass to assume as a center of gyration the center of gravity of the rotating mass and its unbalanced load. Thus, the arms 21 of the spider-like frame 22, earlier above described, and the supporting lugs 20 of the casing structure, being paired together as already above mentioned and preferably in an odd number of pairs, such as three, are so related to the rotating mass as to form, at the lugs 20, supports that lie in a plane at or, preferably, slightly above the center of gravity of the rotating parts, substantially in the relationship shown in Figure 1, and it is preferably at the connection between the arms 21 and the lugs 20 that I provide suitable yieldability to permit the rotating mass to shift its axis of rotation relative to the normal vertical position of that axis.

This yieldability is preferably and conveniently provided by connections which include preferably a suitable yieldable material like rubber, and a suitable form of mounting or connection device between the arms 21 and their respective supporting lugs 20 may take the form of that shown in detail in Figure 1. Thus, the lug 20 is bored or drilled to provide a cylindrical hole 85 provided with a shoulder 86 near its lower end to receive the outer metal sleeve 87 to the interior of which is secured, as by vulcanizing thereto, a sleeve-like part or annulus 88 of rubber to whose inner cylindrical face is secured, again as by vulcanizing, a metal sleeve 90. Through the sleeve 90 extends a capscrew 91 that is threaded into a threaded hole in the upper end of the arm 21, the inner metal sleeve 90 preferably extending downwardly past the shoulder 86 to a sufficient extent to engage the upper face of the end of arm 21, so that the screw 91 may clamp the inner sleeve 90 to the arm 21 and also so that the upper face of the latter is held sufficiently spaced from the under face of the lug 20. Preferably, a sheet metal cap 92 (Figures 1 and 3) secured in any suitable manner to the upper face of the lug 20, closes over the upper end of this resilient mounting. As is better shown in Figure 3, the other arms of the spider-like frame are by a similar means or arrangement connected to their respective stationary supporting lugs.

Accordingly, when the rotating mass becomes dynamically unbalanced, the yieldability of the above-described preferred form of mounting permits the rotating mass to respond to a limited conical precessional motion. The precession thus developed is stable since the center of gravity of the rotating parts is coincident with or slightly below the plane of the effective supports, as above described. The yieldable or resilient mounting connections tend to prevent the transmission of vibration to the casing structure, and by the friction or resistance of the rubber masses in the supporting connections, precession is retarded and is ultimately completely negatived, restoring the rotating mass to a position with its axis in normal position.

The ends of the outwardly diverging arms 21 of the spider frame 22 will be seen to fall within a circle the diameter of which is less than the internal diameter of the upper end portion 15 of the casing 10 so that, upon the removal of casing parts 63 and 62, the rotatable unit with its spider-like frame may be readily and easily entered into or removed out of the casing; suitable provision is also made for extending the circuit of the conductors 37 that lead to the motor windings where the preferred type of motor drive and construction, as above described, is employed, and that preferably comprises a flexible metallic conduit 93 (Figure 1) encasing the conductors 37 and suitably secured, as by a cap 94 threaded onto the lower threaded end 25ª of the stud shaft 25, may be used to anchor the conduit 93 thereto, thus to form a continuation of the conductor-carrying passageway 36 of the shaft 25. The cap 94 may also function as a lock nut for the clamping nut 45. The other end of the flexible conduit 93 may be brought to the exterior of the casing structure 10 in any suitable manner, for example, as indicated in Figure 1 with respect to the casing portion 14 which may be constructed or otherwise provided with any suitable arrangement or construction, generally indicated at 95, to form a terminus for the one end of the conduit 93 and to form also and preferably a suitable junction box for connecting the power line to the conductors 37. The flexibility of the conduit 93, moreover, is sufficient to permit the center of gyration to shift and to permit precessional motion of the rotating mass to take place, as above described.

As above indicated, the outwardly converging slots or passages in which the infested flour is treated may take various forms other than that of Figure 1, and to illustrate, I have shown two possible modifications in the drawings. Thus, turning first to Figures 4 and 5, the annular outwardly converging spaces or slots, instead of extending substantially at right angles to the axis of rotation, as in Figure 1, may be given a substantially frusto-conical shape, as indicated at 68ª in Figures 4 and 5.

A convenient way of achieving this relationship is preferably again to employ a frusto-conical cap-like hub 61, as shown in Figure 1, for interrelationship in a similar way to the driven mounting part 46, and to provide the hub 61, as by forming it integrally therewith, with a downwardly and outwardly or frusto-conical member 60ª whose upper frusto-conical surface M terminates in a flat annular face J; upon the annular face J are superimposed upon each other frusto-conical members 70ª and a top member 71ª which is extended upwardly and inwardly into close proximity to, and about, the downward extension 66ª of the inlet conduit or passageway 11.

The lower frusto-conical faces C of the members 70ª and 71ª terminate in annular faces F similar to, and respectively juxtaposed to, the annular faces J of the upper frusto-conical faces M. The annular faces J and F are preferably in planes at right angles to the axis of rotation and assembly of members 60ª, 70ª and 71ª and appropriate spacing between parallel faces J and F is achieved as by washers 73 interposed therebetween and strung on the screws 72 as will be apparent by reference to Figures 4 and 5. This assembly is similar to that of the plates 60, 70 and 71 of Figure 1. The spacing between faces J and F may be on the order of that between faces F and H of Figures 1 and 2.

Figures 4, 5:
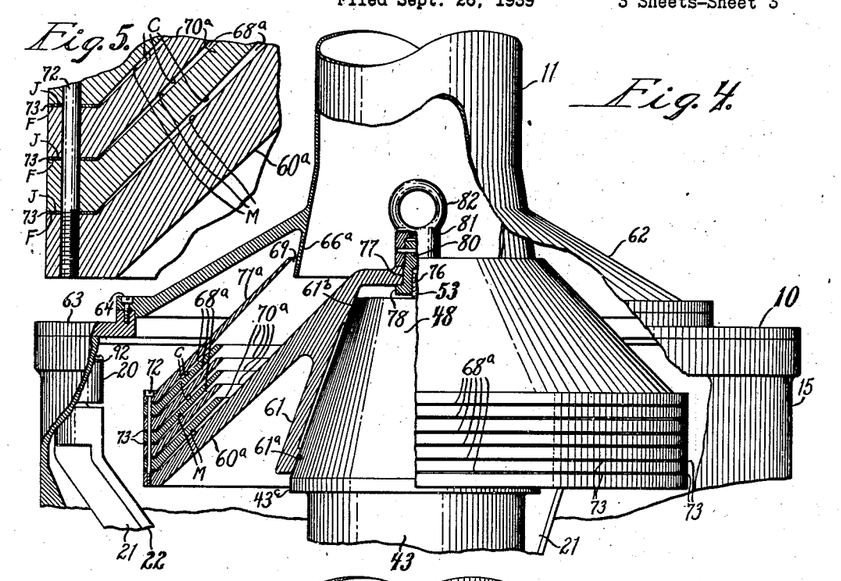
Figure 4 is a view like that of Figure 1 showing the apparatus with certain of its parts embodied in a modified form.
Figure 5 is a fragmentary view on an enlarged scale of portions of certain of the parts of Figure 4.

The upwardly and inwardly inclined portions of the plates 70ª (Figures 4 and 5) are suitably shaped or their surfaces configured to give the desired convergence or restriction of the continuous spaces or slots 68ª formed between pairs of adjacent faces C and M, as indicated in Figures 4 and 5; these faces may be frusto-conical and the relative dimensions of the parts and minimum and maximum thicknesess of the spaces and angle of convergence may be on the order of those of the spaces between faces C and H of Figures 1 and 2 as earlier described.

The action of the form of apparatus of Figure 4 will be clear in view of what has been set forth above as to the form of Figure 1, the drive and mounting in other respects being preferably the same as that of Figures 1 and 3. With the form of Figures 4 and 5 the flour and its infestation move in twisted curvilinear paths, paths that include spiral and helical components, and the destruction of the various forms of insect life occurs by a similar action as earlier above described, faces C and M of Figures 4 and 5 corresponding in the action to faces C and H of Figures 1 and 2 and faces J and F of Figures 4 and 5 corresponding to faces F and H of Figures 1 and 2.

Figure 6:
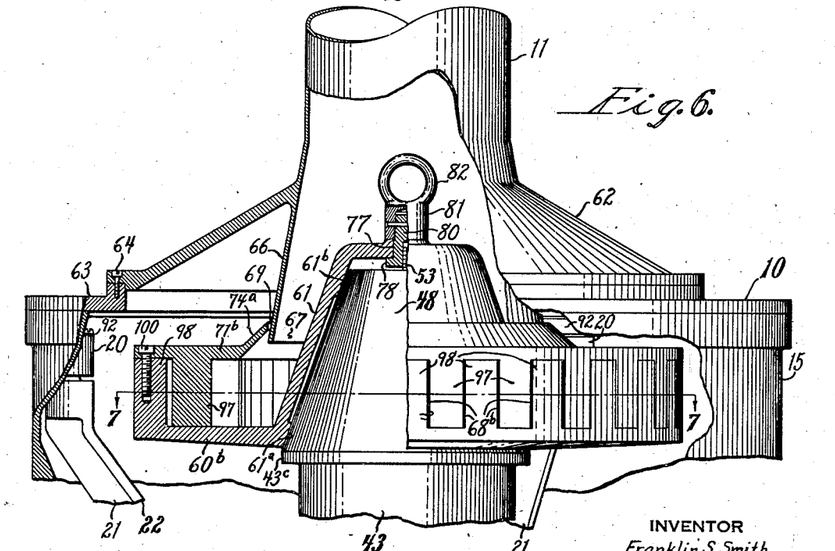
Figure 6 is a view like that of Figure 1 showing the apparatus with certain of the parts embodied in a further illustrative modified form.

Turning now to Figures 6 and 7, the outwardly converging spaces or slots 68ª, instead of each encircling the axis of rotation, as at 68 in Figures 1 and 2, and as at 68ª in Figures 4 and 5, extend individually from a point or region near the axis to a point or region more remote from the axis with their faces formed by planes that extend in a direction substantially parallel to the axis. Illustratively, they extend from one to the other of two spaced bounding planes which are preferably parallel to each other and at right angles to the axis of rotation. Each slot, as better appears from Figure 7, is at an angle to a radius to a slot entrance of preferably not less than about 135°, as measured against the clockwise direction of revolution about the common slot axis.

In the preferably cylindrical periphery of the rotary flour-treating unit, as the latter appears in Figure 6, the narrowest ends of the spaces or slots 68ᵇ are uniformly distributed and spaced thereabout, being vertical, while the slots themselves extend at an obtuse angle to a tangent drawn against the direction of rotation of the rotating unit. Each slot 68ᵇ is defined by the juxtaposed faces of two elements 97 and 98 of which there are provided two series, one series of elements 98 being preferably integrally formed with and projecting upwardly from the upper face of an annular plate-like portion 60ᵇ (Figure 6) again preferably formed integrally with the cap-like hub member 61 which in turn may be mounted, secured and driven, as described above in detail in connection with Figure 1, and the other series being preferably integrally formed with an upper annular plate member 71ᵇ from the under face of which they depend in spaced relation from each other. When the member 71ᵇ with its spaced depending elements 97 is assembled to the annulus 60ᵇ with its spaced upwardly projecting elements 98, the elements 97 and 98 become alternated with one another, as shown in Figure 7, the end faces of elements 97 fitting snugly against the upper face of the annulus 60ᵇ and the upper faces of the elements 98 fitting snugly against the under face of the annular plate 71ᵇ. Screws 100 are employed to secure the parts 71ᵇ and 60ᵇ together and thus to fix the position of one series of elements 97 relative to the other series of elements 98.

The juxtaposed faces of these elements are machined to give them in horizontal cross-section, as viewed in Figure 7, an inwardly tapered cross-section; juxtaposed faces $C^1$ thus formed are shaped to provide outwardly converging vertical slots making an angle, preferably on the order of that indicated in Figure 7, with the radius, while the other portions (of a radial extent of about ½ inch) the juxtaposed faces may be machined or shaped as at $F^1$ to be substantially parallel to each other and to provide a spacing therebetween equal to the minimum thickness of the converging portions of the slots or spaces, illustratively 0.006 inch. In general, opposed faces $C^1$ and $C^1$ correspond to faces C and H of Figures 1 and 2 and opposed faces $F^1$ and $F^1$ to faces F and H of Figures 1 and 2.

Upon rotation of this form of flour-treating unit, the flour with its insect infestation is again set into movement at sufficient velocity to exert a centrifugal force to move it through the inlets and into the larger ends of the converging spaces or slots $68^b$, the inner ends of the elements 97 and 98 being suitably shaped, as indicated in Figure 7, to form funnel-like mouths for guiding the product into the slots. The exerted centrifugal forces move the material in a direction toward the narrower portions of the slots, the particles partaking of twisted curvilinear paths; flour particles are discharged through the narrowest outer portions of the converging spaces while the insect infestation, in whatever form it happens to be, is by a similar action forced farther and farther into the converging spaces to become crushed or squeezed, and thus destroyed, and finally and preferably entrapped against exit.

In both forms of Figures 4 and 6, the entrapped destroyed insect infestation may be removed in any suitable way, as by removal of the rotary treating unit, and, if desired, by disassembly thereof to expose the various faces C—M and J—F of Figures 4 and 5 and faces $C^1$ and $F^1$ of Figure 7. In both forms, also, and as already above indicated, the mounting or support from the casing structure is preferably as was described in Figure 1 so that the rotating mass, if it becomes unbalanced, may shift or change the position of its axis and partake of a precessional movement and ultimate dissipation thereof, as described in detail in connection with Figure 1. Where, as in the three illustrative embodiments, such a mounting is employed, the annular passage 69 is, of course, of sufficient extent to permit precessional movement to take place.

The forms shown in Figures 4-5 and in Figures 6-7, due to the spaces or slots being at substantial angles to the motor axis, may be made of somewhat lesser outside diameter than the form shown by Figure 1, and still have the same angle of convergence and length of slot and the same centrifugal force exerted at the slot entrances, where, as in the illustrative forms, the slot entrances are all arranged on like diameters and assume the same R. P. M. The slots, at the angles mentioned above, may be as long and as acute as those of Figure 1 but due to the angle, the apparatus is smaller in diameter and, of course, less centrifugal force is generated at the discharge ends of slots.

In the case of Figures 4 and 5, the angle between a plane at right angles to the axis of rotation and the under surface C of the members $70^a$ and $71^a$ should not be so large that the flour will not flow because of its being held centrifugally against movement along those surfaces; that angle is preferably not in excess of 50 degrees.

In referring to the flow of the product, the term "substantially unrestricted passageway" is used in the sense that all of a flowable product composed of individual solid parts, such, for example, as flour, meal, etc., will flow through the passageway without stoppage. In this sense, the passageway must be free of restrictions or configurations which might stop, trap or pocket any of the parts of the product to interfere with the operation of the machine.

The term "lethal trauma" is used in the sense that a fatal physical injury is inflicted. Accordingly, during treatment, each entity or particle of insect life is physically injured, mutilated, or deformed, to cause death.

It will thus be seen that there has been provided in this invention a dependable, simple and practical method for effecting the sterilization of flour and like products, and that there has also been provided practical and efficient apparatus for facilitating the carrying out of such method. It will, moreover, be noted that the various objects hereinbefore pointed out or noted, together with many thoroughly practical advantages are successfully achieved, and it will be seen that the invention may be carried out in practice in a thoroughly dependable, practical and efficient manner. Where the apparatus embodies a rotary element or elements operating at relatively high peripheral velocities for effecting the movement of the flour and insect infestation, adequate safeguards, it will be seen, are also provided for insuring the safe, dependable and long-lasting operation of that form of apparatus.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. In apparatus for effecting the destruction of all insect life in a flowable product composed of individual solid parts, the combination of, a rotary treating device, confining means associated with said device and forming a treating space confined to the dimensions of said device and having an inlet forming a substantially unrestricted passageway to allow a substantially even stream of said product to flow freely to said treating space, the smallest dimension of said treating space being larger than the maximum dimension of the individual parts of said product, means to feed said product to said inlet so that it may flow through said treating space, and means to rotate said treating device at a high speed to provide a life-destroying engagement between every individual particle of insect life and said treating device during passage of said product through said treating space, said apparatus including a product outlet extending substantially around said treating device through which the product falls away from said treating device.

2. In apparatus for effecting the destruction of all insect life in a flowable product composed of individual solid parts, the combination of, a rotary treating device having two opposed axially spaced surfaces defining a treating space the smallest dimension between said surfaces being larger than the largest of said parts of said product, there being at the central portion of the device an inlet forming a substantially unobstructed passageway to allow a substantially even stream of said product to flow freely to said treating space, means to feed said product to said inlet, and means to rotate said treating device to flow the product outwardly through said treating space by centrifugal force and to provide a life-destroying engagement between said device and every individual particle of insect life, said inlet means and said surfaces adapted to confine said product to said treating space during flow of the product through the treating space, said apparatus including a product outlet extending substantially around said treating device through which the product falls away from said treating device.

3. In apparatus for effecting the destruction of all insect life in a flowable product composed of individual solid parts, the combination of, a rotary treating device having two opposed axially spaced surfaces defining a treating space, the smallest dimension between said surfaces being larger than the largest of said parts of said product and smaller than the smallest form of insect life in said product, there being at the central portion of the device an inlet forming a substantially unrestricted passageway to allow a substantially even stream of said product to flow freely to said treating space, means to feed said product to said inlet, and means to rotated said rotary device to flow the product outwardly through said treating space by centrifugal force and to provide a life-destroying engagement between said device and every individual particle of insect life in the product.

4. In apparatus for effecting the destruction of all insect life in a flowable product composed of individual solid parts, the combination of, a rotary treating device having a hub portion and a radially extending portion, said radially extending portion including a pair of spaced plates having opposed coextensive surfaces, said opposed coextensive surfaces converging toward each other as the radius increases and the minimum dimension therebetween being greater than the maximum dimension of the parts of the product being treated and less than the minimum dimension of the insect life in the product, and there being at said hub portion an inlet forming a substantially unrestricted passageway to allow a substantially even stream of said product to flow freely to said treating space, means to feed said product to said inlet, and means to rotate said rotary device to flow the product outwardly through said treating space by centrifugal force and to provide a life-destroying engagement between said device and every individual particle of insect life in the product.

5. Apparatus as described in claim 4, wherein said radially extending portion is formed by several spaced plates there being between each plate and the adjacent plate opposed coextensive surfaces converging toward each other as the radius increases with the minimum dimension being greater than the dimension of the parts of the product and less than the minimum dimension of the insect life in the product.

6. In apparatus for effecting the destruction of all insect life in a flowable product composed of individual solid parts, the combination of, a circular rotary device rotatably mounted and positioned to receive a stream of the product and presenting two opposed annular treating surfaces one of which is planar and the other of which is substantially frusto-conical to thereby define a treating space therebetween which is thinnest at the periphery of the rotor, the minimum dimension of the space being greater than the maximum dimension of the particles of the product being treated and less than the minimum dimension of the insect life in the product, there being at the central portion of the device an inlet forming a substantially unrestricted passageway to allow a substantially even stream of said product to flow freely to said treating space, means to feed said product to said inlet, and means to rotate said rotary device to flow the product outwardly through said treating space by centrifugal force and to provide a life-destroying engagement between said device and every individual particle of insect life in the product thereby to inflict lethal trauma on all insect life.

7. Apparatus as described in claim 6, wherein said central portion of the device is in the form of a hub against which the product is directed in an axial direction, and wherein the diameter of the hub increases in the direction of the flow of the product.

8. In apparatus for effecting the destruction of all insect life in a flowable product composed of individual solid parts, the combination of, product-directing means to direct the product in a supply stream at a controlled rate, and rotor means having its central portion positioned to receive said product from said product-directing means and to impart to the product rotary movement to thereby centrifugally propel the product away from the axis of rotation in a plurality of treating streams which are thinner and moving faster than said supply stream, said product-directing means and said central portion of said rotary means forming a substantially unrestricted passageway to allow said supply stream of said product to flow freely, said rotor including insect mutilating surfaces effective to inflict lethal trauma on all of the insect life upon rotation.

9. In apparatus for effecting the destruction of all insect life in a flowable product composed of individual solid parts, the combination of, means to direct a stream of the product from the supply toward a zone of treatment, said means forming a substantially unrestricted passageway to allow said stream to flow freely, a treating rotor adapted upon rotation to receive the product and pass the product through the zone of treatment and during the passage therethrough to inflict lethal trauma upon the insect life, said rotor having mounted thereon air-guiding means immediately adjacent said first-mentioned means to direct air into the zone of treatment, and motive means to rotate said treating rotor.

10. Apparatus as described in claim 9, wherein said air-guiding means is in the form of annular confining means extending from the inner peripheral edge of the treatment zone in the direction from which the stream of the product is received.

11. In the art of effecting the destruction of all insect life in a flowable product composed of individual solid parts, the steps which comprise, causing a continuous flow of the product by imparting rotary motion thereto thereby to cause the product to exert centrifugal forces, and acting violently on all insect life in the product when said insect life reaches its maximum velocity thereby to inflict lethal trauma on all said insect life.

12. Apparatus as described is claim 1 which includes a casing means surrounding said treating device and extending below said outlet to provide a space within which said product falls after being treated and after passing from said outlet.

13. Apparatus as described in claim 8 which includes a casing means surrounding said rotor means and extending therebelow thereby to provide a closed space within which the treated product falls and the separate treating streams rejoin.

14. Apparatus as described in claim 1 wherein said treating device is provided with a hub portion having a frusto-conical product deflecting surface against which the stream of the product is directed in an axial direction whereby the deflecting surface directs the product radially.

15. In apparatus for effecting the destruction of all insect life in a flowable product composed of individual solid parts, the combination of, a rotary treating device, confining means associated with said device including a pair of axially spaced plates the opposed faces of which form a treating space confined to the dimensions of said device, one of said plates having a central annular inlet opening, stationary feeding means projecting through said annular inlet opening substantially concentrically therewith, said inlet opening and said stationary feeding means providing an inlet forming a substantially unrestricted passageway to allow a substantially even stream of said product to flow freely to said treating space, the smallest dimension of said treating space being larger than the maximum dimension of the individual parts of said product, means to feed said product through said stationary feeding means to said inlet so that it may flow through said treating space, and means to rotate said treating device at a high speed to provide a life-destroying engagement between every individual particle of insect life and said treating device during passage of said product through said treating space, said apparatus including a product outlet extending substantially around said treating device through which the product falls away from said treating device.

16. In apparatus for effecting the destruction of all insect life in a flowable product composed of individual solid parts, the combination of, a rotary treating device having a vertical axis, confining means associated with said device and forming a treating space confined to the dimensions of said device and having an inlet forming a substantially unrestricted passageway to allow a substantially even stream of said product to flow freely from a supply above said treating device to said treating space, the smallest dimension of said treating space being larger than the maximum dimension of the individual parts of said product, means above said treating device to feed said product to said inlet so that it may flow through said treating space, an electric motor positioned beneath said treating device and concentric therewith to rotate said treating device at a high speed to provide a life-destroying engagement between every individual particle of insect life and said treating device during passage of said product through said treating space, and a casing forming with said apparatus a product outlet about said treating device and said motor and providing a space through which the product falls from said treating device downwardly in a substantially annular stream about said motor and spaced therefrom.

17. In apparatus for effecting the destruction of all insect life in a flowable product composed of individual solid parts, the combination of: a substantially air-tight casing construction; a rotary treating device located wholly within said casing having an inlet portion and an outlet portion and adapted upon rotation to receive the product at the inlet portion, pass the product through a zone of treatment to inflict lethal trauma upon all insect life, and discharge the product at said outlet portion; and conduit means to direct a stream of the product into said casing construction and toward said treating device and forming a substantially unrestricted passageway which is substantially air-tight to prevent the entry of air other than the air trapped in the product; said treating device and said casing having associated therewith recirculation means to direct air through said zone of treatment and from said outlet portion to said inlet portion; whereby the product is discharged from said casing without excess air.

18. In the art of effecting the destruction of all insect life in a flowable product composed of individual solid parts, the steps which comprise, flowing a substantially even stream of the product to a zone of treatment, interfering with the movement of the insect life through the treatment zone by mechanically engaging all of the insect life with sufficient mechanical violence and physical shock to inflict lethal trauma on all of said insect life without stoppage of the flow of the product, and utilizing the action of gravity at the point in the stream where the treating step is completed to insure the continued flow of the stream from the zone of treatment.

19. In the art of effecting the destruction of all insect life in a flowable product composed of individual solid parts, the steps which comprise, flowing a substantially even stream of the product through a zone of treatment under centrifugal force, and interfering with the movement of the insect life through the treatment zone by mechanically engaging all of the insect life with sufficient mechanical violence and physical shock to inflict lethal trauma on all of said insect life without stoppage of the flow of the product.

20. In the art of effecting the destruction of all insect life in a flowable product composed of individual solid parts, the steps which comprise, flowing a stream of the product through a zone of treatment, and interfering with the movement of the insect life through the treatment zone by mechanically engaging all of the insect life with sufficient mechanical violence and physical shock to inflict lethal trauma on all of said insect life without stoppage of the flow of the product.

21. In apparatus for effecting the destruction of all insect life in a flowable product composed of individual solid parts, the combination of, a rotary treating device having a vertical axis, confining means associated with said device and forming a treating space confined to the dimensions of said device and having an inlet at the central portion thereof forming a substantially unrestricted passageway to allow a substantially even stream of said product to flow freely to said treating space, the smallest dimension of said treating space being larger than the maximum dimension of the individual parts of said product, stationary feeding means above said device extending into said inlet to feed the product to said device so that it may flow through said treating space, and means to rotate said treating device at a high speed to provide a life-destroying engagement between every individual particle of insect life and said treating device during passage of said product through said treating space, said apparatus including a product outlet extending substantially around said treating device through which the product falls away from said treating device.

22. In apparatus for effecting the destruction of all insect life in a flowable product composed of individual solid parts, the combination of, a rotary treating device having two opposed axially spaced surfaces defining a treating space the smallest dimension between said surfaces being larger than the largest of said parts of said product, there being at the central portion of the device an inlet forming a substantially unobstructed passageway to allow a substantially even stream of said product to flow freely to said treating space, the surfaces of said device at points spaced from said inlet being shaped to engage all insect life in the product, means to feed said product to said inlet, and means to rotate said treating device to flow the product outwardly through said treating space by centrifugal force and to provide a life-destroying engagement between said device and every individual particle of insect life, said inlet means and said surfaces adapted to confine said product to said treating space during flow of the product through the treating space, said apparatus including a product outlet extending substantially around said treating device through which the product falls away from said treating device.

23. In apparatus for effecting the destruction of all insect life in a flowable product composed of individual solid parts, the combination of, a rotary treating device having two opposed axially spaced surfaces defining a treating space the smallest dimension between said surfaces being larger than the largest of said parts of said product, there being at the central portion of the device an inlet forming a substantially unobstructed passageway to allow a substantially even stream of said product to flow freely to said treating space, the surfaces of said device at points spaced from said inlet being shaped to engage all insect life in the product, stationary feeding means extending into said inlet to feed the product to said device, and means to rotate said treating device to flow the product outwardly through said treating space by centrifugal force and to provide a life-destroying engagement between said device and every individual particle of insect life, said inlet means and said surfaces adapted to confine said product to said treating space during flow of the product through the treating space, said apparatus including a product outlet extending substantially around said treating device through which the product falls away from said treating device.

FRANKLIN S. SMITH.